United States Patent
Lee

(10) Patent No.: US 11,558,351 B2
(45) Date of Patent: Jan. 17, 2023

(54) DUAL-MODES SWITCHING METHOD FOR BLOCKING NETWORK CONNECTION

(71) Applicant: UPAS CORPORATION, Taipei (TW)

(72) Inventor: Kun-Jung Lee, Taipei (TW)

(73) Assignee: UPAS CORPORATION, Taipei (TW)

( * ) Notice: Subject to any disclaimer, the term of this patent is extended or adjusted under 35 U.S.C. 154(b) by 134 days.

(21) Appl. No.: 17/203,529

(22) Filed: Mar. 16, 2021

(65) Prior Publication Data

US 2022/0060447 A1 Feb. 24, 2022

(30) Foreign Application Priority Data

Aug. 20, 2020 (TW) .................................. 109128480

(51) Int. Cl.
*H04L 9/40* (2022.01)
(52) U.S. Cl.
CPC ...... *H04L 63/0236* (2013.01); *H04L 63/0876* (2013.01)
(58) Field of Classification Search
None
See application file for complete search history.

(56) References Cited

U.S. PATENT DOCUMENTS

| | | | | |
|---|---|---|---|---|
| 8,176,561 | B1* | 5/2012 | Hurst | H04L 63/1433 726/1 |
| 9,654,458 | B1* | 5/2017 | Bhaktwatsalam | H04L 63/1466 |
| 2010/0241744 | A1* | 9/2010 | Fujiwara | H04L 63/0236 709/224 |
| 2019/0130019 | A1* | 5/2019 | De | H04W 24/02 |
| 2019/0132362 | A1* | 5/2019 | Hutchinson | H04L 41/0866 |
| 2021/0377215 | A1* | 12/2021 | Wang | H04L 63/0227 |

* cited by examiner

*Primary Examiner* — Scott B Christensen
(74) *Attorney, Agent, or Firm* — Maschoff Brennan

(57) ABSTRACT

The invention discloses a dual-modes switching method for blocking a network connection, comprising: a data packet collecting step of collecting data packets transmitting from all network nodes in a network segment, a data packet analyzing step of analyzing the data packets collected to obtain network node identification data, a list comparing step of comparing the network node identification data with identification data registered in an information device list to determine an illegal network node, an illegal-network-node-type determining step of determining what kind of type the illegal network node is, and a network connection blocking step of switching a first network connection blocking mode and a second network connection blocking mode according to the type of the illegal network node, thereby blocking the network connection of the illegal network.

8 Claims, 6 Drawing Sheets

DUAL-MODES SWITCHING METHOD FOR BLOCKING NETWORK CONNECTION

FIELD OF THE INVENTION

The present invention relates to a method for blocking a network connection, and more particularly relates to a dual-modes switching method for blocking a network connection.

BACKGROUND OF THE INVENTION

In consideration of information security, a company makes all-out efforts to prevent external information devices from accessing the data stored in internal network of the company. The data access from external information devices may cause an unexpected network attack from a ransomware. Therefore, a data security staff in a company always pays more special attention about how to completely block data access to the company's internal network from the external information devices.

However, a data security system merely applying the above mentioned blocking mode, i.e., "completely blocking data access to the company's internal network from the external information devices" is with disadvantages that the data security system could not flexibly adjust blocking operation according to different types of information devices. Accordingly, a completely blocking data access from external information devices to company's internal network could not be achieved. Moreover, there is another problem of not efficiency. The diverse types of external information devices may cause the data blocking operation being performed in a low efficiency, thereby provoking a drawback that enormous information packets are lost in the company's internal network.

SUMMARY OF THE INVENTION

Accordingly, one objective of the present invention is to provide a dual-modes switching method for blocking a network connection to effectively block network access from the external information device to the company's internal network.

In order to achieve the above objective, the present invention provides a dual-modes switching method for blocking a network connection, comprising: a data packet collecting step of collecting data packets transmitting from all network nodes in a network segment, wherein the network nodes are information devices and gateway devices which perform the network connection in the network segment; a data packet analyzing step of analyzing the data packets collected from all of the network nodes in the network segment to obtain network node identification data that identifies the network node, the network node identification data including a MAC address, OUI data, ARP firewall data and static ARP data; a list comparing step of comparing the network node identification data with information device identification data or gateway identification data registered in an information device list such that a network node in the network segment is determined as an illegal network node when the network node is with information device identification data not matching with information device identification data registered in the information device list; an illegal-network-node-type determining step of determining: whether the illegal network node is a predetermined manufacturer information device produced by a manufacturer in a predetermined manufacturer list according to the MAC address and the OUI data which are obtained in the data packet analyzing step, whether the illegal network node is an ARP firewall information device according to the ARP firewall data which is obtained in the data packet analyzing step, or whether the illegal network node is a static ARP information device according to the static ARP data which is obtained in the data packet analyzing step; and a network connection blocking step, which applies a first network connection blocking mode to block a network connection of the illegal network node in the network segment when the illegal network node is the predetermined manufacturer information device, the ARP firewall information device or the static ARP information device, and then automatically switching to apply a second network connection blocking mode to block the network connection of the illegal network node in the network segment when the illegal network node is not the predetermined manufacturer information device, not the ARP firewall information device and not the static ARP information device, wherein in the first network connection blocking mode, when the illegal network node broadcasts a MAC address query toward a target network node in the network segment, a network connection blocking module is provided to unicast-transmit, to the illegal network node, a data packet indicating that the MAC address of the target network node is the MAC address of the network connection blocking module, and the network connection blocking module unicast-transmits, to the gateway, a data packet indicating that the MAC address of the illegal network node is the MAC address of the network connection blocking module such that the network connection of the illegal network node is blocked without triggering the ARP firewall of the illegal network node, in the second network connection blocking mode, when the illegal network node broadcasts the MAC address query toward the target network node in the network segment, the network connection blocking module is provided to unicast-transmit, to the illegal network node, a data packet indicating that the MAC address of the target network node is the MAC address of the network connection blocking module, and continuously unicast-transmit, during a predetermined period, to the illegal network node, a data packet indicating that the MAC address of the gateway in the network segment is the MAC address of the network connection blocking module, and the network connection blocking module is provided also to broadcast, to all the network nodes in the network segment, a data packet indicating that the MAC address of the illegal network node is the MAC address of the network connection blocking module such that the network connection of the illegal network node is blocked.

In one embodiment of the present invention, the dual-modes switching method is provided, wherein the first network connection blocking mode, the network connection blocking module is further provided to unicast-transmit, to the illegal network node, a data packet which indicates that the MAC addresses of all the information devices in the network segment are the MAC address of the network connection blocking module, such that the network connection of the illegal network node is blocked.

In one embodiment of the present invention, the dual-modes switching method is provided, wherein the network node identification data further includes an IP address.

In one embodiment of the present invention, the dual-modes switching method is provided, wherein in the illegal-network-node-type determining step, when the illegal network node is not the predetermined manufacturer information device, the dual-modes switching method then determines whether the illegal network node is the ARP firewall information device or not.

In one embodiment of the present invention, the dual-modes switching method is provided, wherein in the illegal-network-node-type determining step, when the illegal network node is not the ARP firewall information device, the dual-modes switching method then determines whether the illegal network node is the static ARP information device or not.

In one embodiment of the present invention, the dual-modes switching method is provided, wherein in the data packet analyzing step, the network node identification data is obtained by applying a network interface controller installed in the network node to collect the data packet which is transmitted from the network node in the network segment and directly analyzing the data packet.

In one embodiment of the present invention, the dual-modes switching method is provided, wherein in the illegal-network-node-type determining step, the static ARP information device is an information device whose IP address and the MAC address are with one-to-one relationship.

In one embodiment of the present invention, the dual-modes switching method is provided, wherein in the second network connection blocking mode, the predetermined period is 4 seconds.

The dual-modes switching method of the present invention has the technical effects as follows. The performance for blocking the network connection for the external information devices from accessing the company's internal network is improved. Moreover, the dual blocking modes of the present invention, which could be automatically switched according to different types of the external information device, could also improve the efficiency for network connection blocking.

DETAILED DESCRIPTION OF THE PREFERRED EMBODIMENTS

The preferred embodiments of the present invention are described in detail with reference to FIGS. 1 to 6. The description is used for explaining the embodiments of the present invention only, but not for limiting the scope of the claims.

Figure 1:
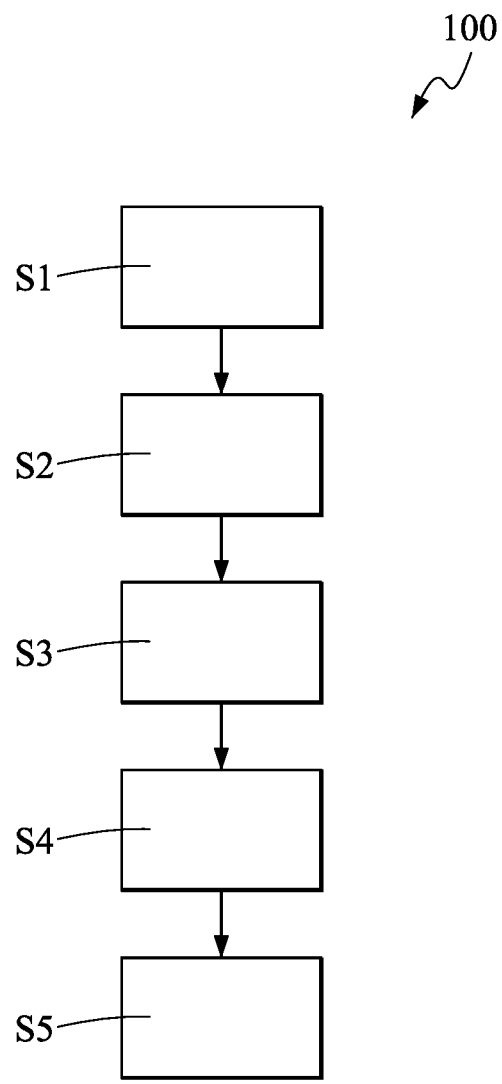
FIG. 1 is a flow chart illustrating a dual-modes switching method for blocking a network connection according to the present invention.

As shown in FIG. 1, a dual-modes switching method 100 for blocking a network connection according to one embodiment of the present invention, comprises: a data packet collecting step S1, a data packet analyzing step S2, a list comparing step S3, an illegal-network-node-type determining step S4 and a network connection blocking step S5. Therefore, the dual-modes switching method 100 of the present invention is capable of upgrading the performance on blocking the network connection so as to prevent the external information devices from accessing the company's internal network. Moreover, the present invention can automatically switch between two blocking modes for blocking the network connection according to the different types of the external information devices, thereby increasing the efficiency for blocking the network connection.

Figure 5:
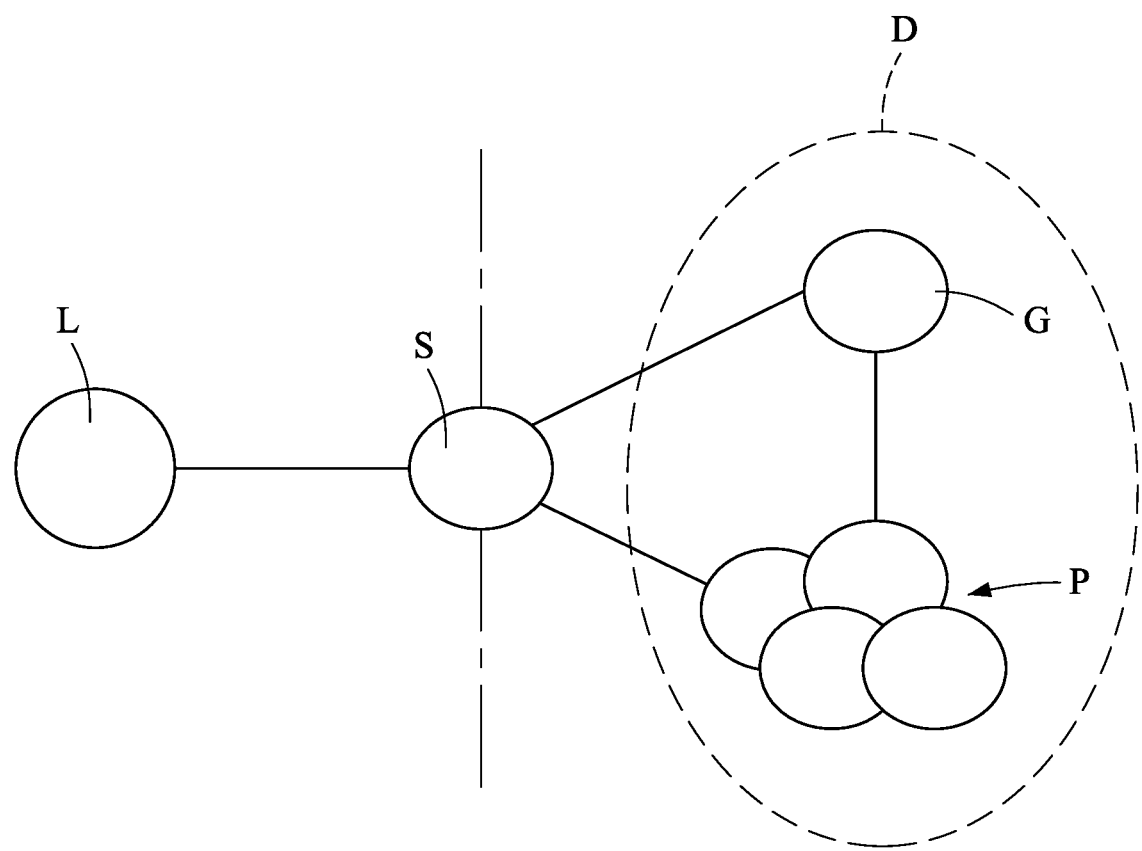
FIG. 5 is a schematic drawing of a network connection blocking relation.

As shown in FIGS. 1 and 5, in the data packet collecting step S1, data packets transmitting from all network nodes in a network segment D are collected, wherein the network nodes are information devices P and gateway devices G which perform the network connection in the network segment D. For example, the network segment D is a broadcast domain in an internal network of a company.

As shown in FIGS. 1 and 5, in the data packet analyzing step 2, the data packets collected from all of the network nodes in the network segment D are analyzed to obtain network node identification data that identifies the network node. The network node identification data includes a MAC address (Media Access Control Address), OUI (Organizationally Unique Identifier) data, ARP (Address Resolution Protocol) firewall data and static ARP data. However, the present invention is not limited to this, and the network node identification data may further include an IP address (Internet Protocol Address).

Specifically, in the data packet analyzing step S2 of the dual-modes switching method 100 according to the embodiment of the present invention, the data packet which is transmitted from the network node in the network segment D is collected by applying a network interface controller installed in the network node and the data packet is directly analyzed to obtain the network node identification data. In detail, the static ARP data in the network node identification data is obtained by agent data obtaining software, wherein the agent data obtaining software is developed by the applicant of the present invention and is applied to a computer terminal to obtain the network node identification data when a network connection is to be performed, and the agent data obtaining software is different from WMI (Windows Management Instrumentation) data obtaining software since the agent data obtaining software provides the network node identification data no matter whether the network node is installed with a Windows operating system or not.

As shown in FIGS. 1 and 5, in the list comparing step S3, the network node identification data is compared with information device identification data or gateway identification data registered in an information device list such that a network node in the network segment D is determined as an illegal network node L when the network node is with information device identification data not matching with information device identification data registered in the information device list. The information device list is a pre-built list (i.e., a white-list) in which the network node identification data of the information device P and the gateway identification data of the gateway G are registered, such as an IP address or a MAC address, wherein the information device P and the gateway G are in the company's internal network.

Figure 2:
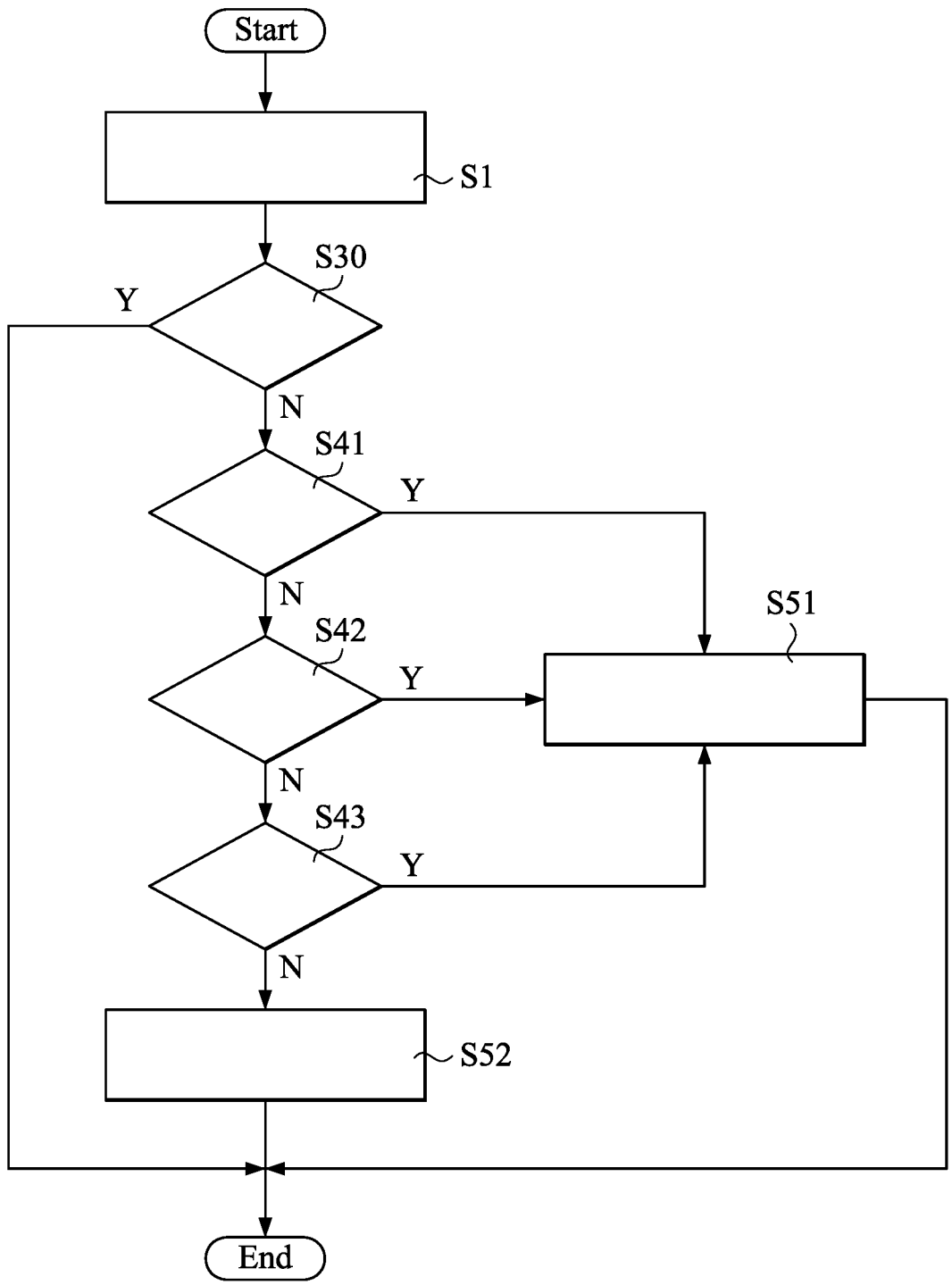
FIG. 2 is a detailed flow chart illustrating an illegal-network-node-type determining step of the dual-modes switching method according to the present invention.

Specifically, as shown in FIGS. 1, 2 and 5, in a legal network node determining step S30, it is determined whether the network node identification data of the network node in the network segment D matches with the information device identification data registered in the information device list or not. When the network node identification data of the network node in the network segment D matches with the information device identification data registered in the information device list, the network node in the network segment D is identified as a legal network node, and the legal network node determining step S30 is finished. In contrast, in the legal network node determining step S30, when the network node identification data of the network node in the network segment D does not match with the information device identification data registered in the information device list, the network node in the network segment D is identified as an illegal network node, and the method proceeds to the illegal-network-node-type determining step S4.

As shown in FIGS. 1 and 5, specifically, in the illegal-network-node-type determining step S4, the illegal network node identification data (i.e., IP address, MAC address, OUI data, ARP firewall data and static ARP data) is collected and analyzed to determine what type of the information device the illegal network node L is. Therefore, it is contribute to the present invention to switch between two blocking modes for blocking the network connection of the illegal network node L (i.e., the external information device) accessing the company's internal network.

In detail, as shown in FIGS. 1, 2 and 5, in a manufacturer determining step S41 of the illegal-network-node-type determining step S4, it is determined whether the illegal network node L is a predetermined manufacturer information device produced by a manufacturer in a predetermined manufacturer list according to the MAC address and the OUI data which is obtained in the data packet analyzing step S2. When the illegal network node L is the predetermined manufacturer information device produced by the manufacturer in the predetermined manufacturer list, the method proceeds to the first network connection blocking mode S51 of the network connection blocking step S5. In contrast, in the manufacturer determining step S41, when the illegal network node L is not the predetermined manufacturer information device produced by the manufacturer in the predetermined manufacturer list, the method proceeds to an ARP firewall determining step S42 of the illegal-network-node-type determining step S4.

Furthermore, the MAC address has 6 bytes, wherein the former 3 bytes of the 6 bytes are obtained by a network interface controller manufacturer applying to IEEE (i.e., Institute of Electrical and Electronic Engineers), and the former 3 bytes are the OUI data. In other words, when the MAC address of the illegal network node L is obtained, the OUI data is obtained. Moreover, the network interface controller manufacturer can be recognized according to the OUI data, such that the type of the information device of the illegal network node L can be known. For example, in an example MAC address "D0-51-62-DD-EE-FF", the network interface controller manufacturer "Sony" can be known from "D0-51-62", and therefore the illegal network node L is determined as the information device manufactured by "Sony"; in an example MAC address "F4-F1-5A-DD-EE-FF", the network interface controller manufacturer "Apple" can be known from "F4-F1-5A", and therefore the illegal network node L is determined as the information device manufactured by "Apple".

As shown in FIG. 2, in an ARP firewall determining step S42 of the illegal-network-node-type determining step S4, it is determined whether the illegal network node L is an ARP firewall information device according to the ARP firewall data which is obtained in the data packet analyzing step S2. When the illegal network node L is the ARP firewall information device, the method proceeds to the first network connection blocking mode S51. In contrast, in the ARP firewall determining step S42, when the illegal network node L is not the ARP firewall information device, the method proceeds to a static ARP determining step S43 of the illegal-network-node-type determining step S4.

Furthermore, for ARP spoofing, at the present, some of the anti-virus software have a function that implements an ARP firewall to protect the information device from the ARP spoofing, wherein the ARP spoofing is an ARP attack technique of which the attackers can obtain data packets in a network segment, tamper with the message of the data packets, and affect a normal network connection between the information devices in the network segment. Moreover, in order to protect from the ARP spoofing, different types of the operating systems have different countermeasures against the ARP spoofing, such as, change the IP address or accelerate query about the gateway. Therefore, in the ARP firewall determining step S42, it is determined whether the anti-virus software of the information device of the illegal network node L implements the ARP firewall, and is determined whether the operating system of the information device of the illegal network node L performs a response to the ARP spoofing.

As shown in FIG. 2, in the static ARP determining step S43 of the illegal-network-node-type determining step S4, it is determined whether the illegal network node L is a static ARP information device according to the static ARP data which is obtained in the data packet analyzing step S2, wherein the static ARP data is obtained by the agent data obtaining software in the data packet analyzing step S2. When the illegal network node L is the static ARP information device, the method proceeds to the first network connection blocking mode S51. In contrast, in the static ARP determining step S43, when the illegal network node L is not the static ARP information device, it is automatically switched to the second network connection blocking mode S52 to block the network connection of the illegal network node L in the network segment D.

Specifically, the static ARP information device is an information device whose IP address and the MAC address are with one-to-one relationship. In other words, in the static ARP determining step S43, the illegal network node L is determined whether the IP address of the information device and the MAC address are with one-to-one relationship or not.

In other words, as shown in FIGS. 1 and 2, in the network connection blocking step S5, a first network connection blocking mode S51 is applied to block a network connection of the illegal network node L in the network segment D when the illegal network node L is the predetermined manufacturer information device, the ARP firewall information device or the static ARP information device. In contrast, it is automatically switched to a second network connection blocking mode S52 to block the network connection of the illegal network node L in the network segment D when the illegal network node L is not the predetermined manufacturer information device, not the ARP firewall information device and not the static ARP information device.

Figure 3:
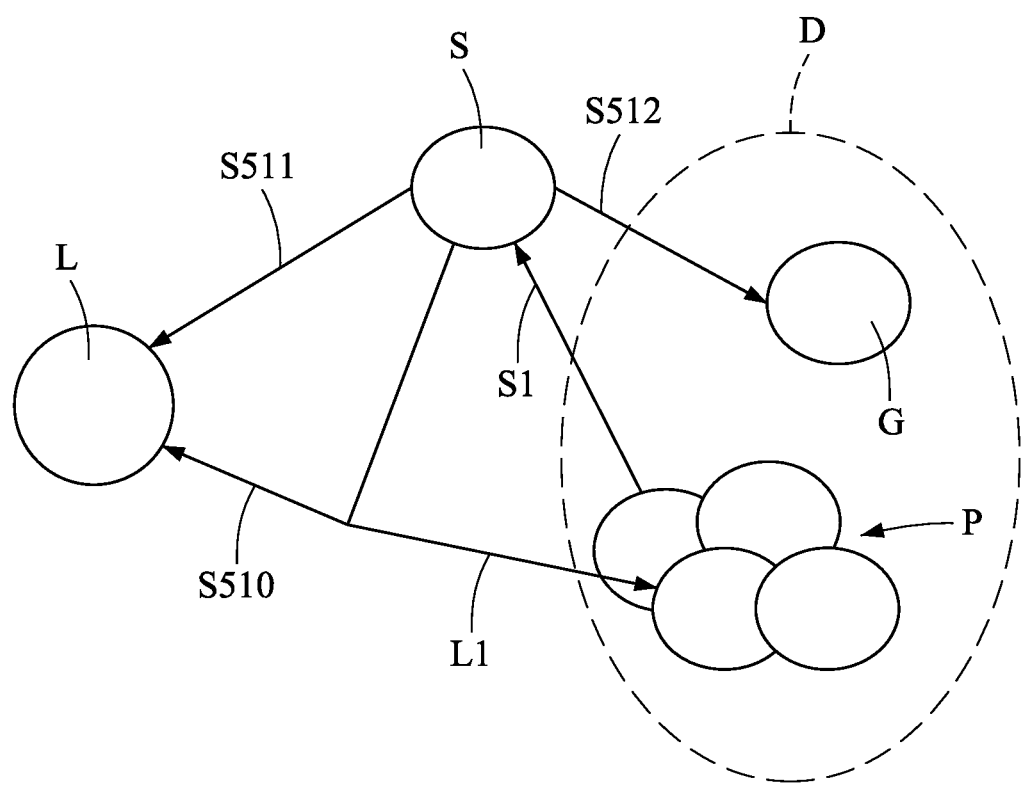
FIG. 3 is a schematic drawing illustrating a first network connection blocking mode performed in the dual-modes switching method according to the present invention.

In detail, as shown in FIGS. 3 and 5, in the first network connection blocking mode S51, when the illegal network node L performs a network node query L1 to broadcast a MAC address query toward a target network node in the network segment D, a network connection blocking module S (it may be a software or a hardware device) is provided to perform a response S510 by unicast-transmitting, to the illegal network node L, a data packet indicating that the MAC address of the target network node is the MAC address of the network connection blocking module S. Moreover, the network connection blocking module S performs a protective message transmission S512 by unicast-transmitting, to the gateway G in the network segment D, a data packet indicating that the MAC address of the illegal network node L is the MAC address of the network connection blocking module S. Therefore, the network connection of the illegal network node L is blocked without triggering the ARP firewall of the illegal network node L.

In detail, as shown in FIGS. 3 and 5, in the first network connection blocking mode S51, the network connection blocking module S is further provided to perform a blocking message transmission S511 by unicast-transmitting, to the illegal network node L, a data packet which indicates that the MAC addresses of all the information devices P in the network segment D are the MAC address of the network connection blocking module S, such that the network connection of the illegal network node L is blocked.

Figure 4:
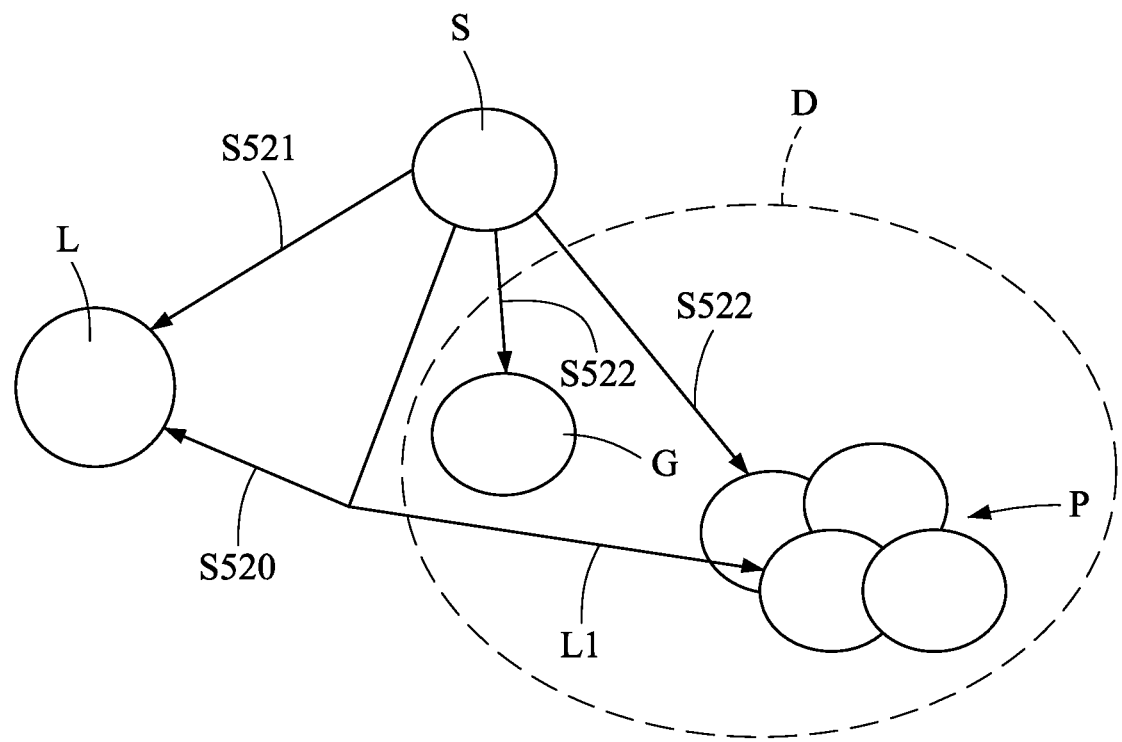
FIG. 4 is a schematic drawing illustrating a second network connection blocking mode performed in the dual-modes switching method according to the present invention.

Furthermore, as shown in FIGS. 4 and 5, in the second network connection blocking mode S52, when the illegal network node L broadcasts the MAC address query toward the target network node in the network segment D, the network connection blocking module S is provided to perform a response S520 by unicast-transmitting, to the illegal network node L, a data packet indicating that the MAC address of the target network node is the MAC address of the network connection blocking module S, and performs an isolation message transmission S521 by continuously unicast-transmitting, during a predetermined period, to the illegal network node L, a data packet indicating that the MAC address of the gateway G in the network segment D is the MAC address of the network connection blocking module S. Moreover, the network connection blocking module S is provided also to perform a protective message transmission S522 by broadcasting, to all the network nodes (i.e., the information device P and the gateway G) in the network segment D, a data packet indicating that the MAC address of the illegal network node L is the MAC address of the network connection blocking module S. Therefore, the network connection of the illegal network node L is blocked by another blocking mode of the present invention.

Figure 6:
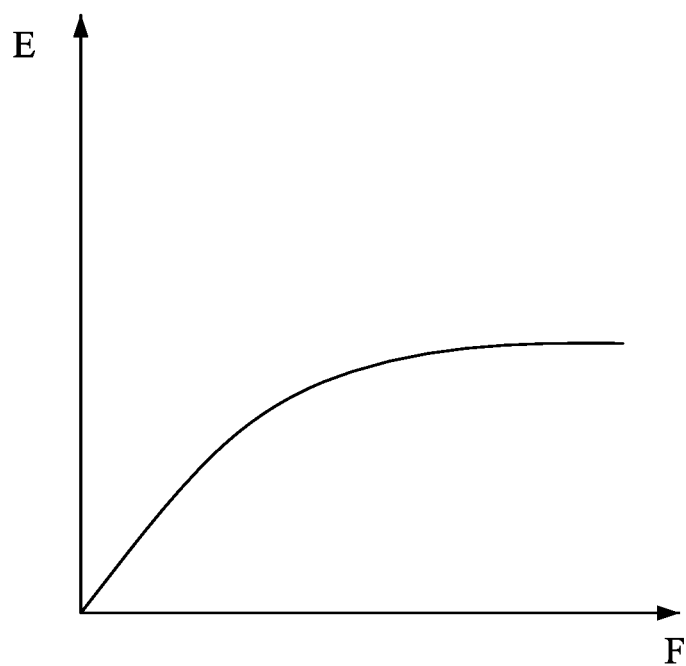
FIG. 6 is a schematic diagram of unicast-transmit frequency-blocking performance curve according to the dual-modes switching method of the present invention.

In the second network connection blocking mode S52 of the dual-modes switching method 100 according to the embodiment of the present invention, the predetermined period is 4 seconds. However, the present invention is not limited to this, and the predetermined period may be 2 seconds, 1 second or 0.1 second. Specifically, as the time interval of the predetermined period decreases, the frequency that the network connection blocking module S unicast-transmits to the illegal network node L correspondingly increases. Moreover, as shown in FIG. 6, the increased frequency (F) relating to unicast-transmit can increase the blocking efficiency (E) of the second network connection blocking mode S52 for blocking the network connection.

As mentioned above, in the dual-modes switching method 100 according to the embodiment of the present invention, the performance for blocking the network connection for the external information devices (i.e., the illegal network node L) from accessing the company's internal network (the network segment D) is improved. The mode switching between the first network connection blocking mode S51 and the second network connection blocking mode S52 is performed according to the result of the manufacturer determining step S41, the result of the ARP firewall determining step S42 or the result of the static ARP determining step S43 in the illegal-network-node-type determining step S4.

Furthermore, the dual-modes switching method 100 integrates the dual blocking modes (i.e., the first network connection blocking mode S51 and the second network connection blocking mode S52) for blocking the network connection. Moreover, the dual blocking modes of the present invention could be automatically switched according to different types of the external information device which is determined in the illegal-network-node-type determining step S4. Therefore, the present invention can block the network connection of the illegal network node L according to different types of the illegal network node L, could also improve the efficiency for network connection blocking.

The above description is merely the explanation of the preferred embodiment of the present invention. The ordinary person skilled in the art can apply other adjustments according to the claims below and the above description. However, the adjustments still belong to the technical concept of the present invention and fall into the claims of the present invention.

What is claimed is:

1. A dual-modes switching method for blocking a network connection, comprising:

a data packet collecting step of collecting data packets transmitting from all network nodes in a network segment, wherein the network nodes are information devices and gateway devices which perform the network connection in the network segment;

a data packet analyzing step of analyzing the data packets collected from all of the network nodes in the network segment to obtain network node identification data that identifies the network node, the network node identification data including a media access control (MAC) address, organizationally unique identifier (OUI) data, address resolution protocol (ARP) firewall data and static ARP data;

a list comparing step of comparing the network node identification data with information device identification data or gateway identification data registered in an information device list such that a network node in the network segment is determined as an illegal network node when the network node is with information device identification data not matching with information device identification data registered in the information device list;

an illegal-network-node-type determining step of determining: whether the illegal network node is a predetermined manufacturer information device produced by a manufacturer in a predetermined manufacturer list according to the MAC address and the OUT data which are obtained in the data packet analyzing step, whether the illegal network node is an ARP firewall information device according to the ARP firewall data which is obtained in the data packet analyzing step, or whether the illegal network node is a static ARP information device according to the static ARP data which is obtained in the data packet analyzing step; and a network connection blocking step, which applies a first network connection blocking mode to block a network connection of the illegal network node in the network segment when the illegal network node is the predetermined manufacturer information device, the ARP firewall information device or the static ARP information device, and then automatically switching to apply a second network connection blocking mode to block the network connection of the illegal network node in the network segment when the illegal network node is not the predetermined manufacturer information device, not the ARP firewall information device and not the static ARP information device, wherein in the first network connection blocking mode, based on the illegal network node broadcasting a MAC address query toward a target network node in the network segment, a network connection blocking module is provided to unicast-transmit, to the illegal network node, a data packet indicating that the MAC address of the target network node is the MAC address of the network connection blocking module, and the network connection blocking module unicast-transmits, to the gateway, a data packet indicating that the MAC address of the illegal network node is the MAC address of the network connection blocking module such that the network connection of the illegal network node is blocked without triggering the ARP firewall of the illegal network node, in the second network connection blocking mode, based on the illegal network node broadcasting the MAC address query toward the target network node in the network segment, the network connection blocking module is provided to unicast-transmit, to the illegal network node, a data packet indicating that the MAC address of the target network node is the MAC address of the network connection blocking module, and continuously unicast-transmit, during a predetermined period, to the illegal network node, a data packet indicating that the MAC address of the gateway in the network segment is the MAC address of the network connection blocking module, and the network connection blocking module is provided also to broadcast, to all the network nodes in the network segment, a data packet indicating that the MAC address of the illegal network node is the MAC address of the network connection blocking module such that the network connection of the illegal network node is blocked.

2. The dual-modes switching method as claimed in claim 1, wherein in the first network connection blocking mode, the network connection blocking module is further provided to unicast-transmit, to the illegal network node, a data packet which indicates that the MAC addresses of all the information devices in the network segment are the MAC address of the network connection blocking module, such that the network connection of the illegal network node is blocked.

3. The dual-modes switching method as claimed in claim 1, wherein the network node identification data further includes an internet protocol (IP) address.

4. The dual-modes switching method as claimed in claim 1, wherein in the illegal-network-node-type determining step, when the illegal network node is not the predetermined manufacturer information device, the dual-modes switching method then determines whether the illegal network node is the ARP firewall information device or not.

5. The dual-modes switching method as claimed in claim 4, wherein in the illegal-network-node-type determining step, when the illegal network node is not the ARP firewall information device, the dual-modes switching method then determines whether the illegal network node is the static ARP information device or not.

6. The dual-modes switching method as claimed in claim 1, wherein in the data packet analyzing step, the network node identification data is obtained by applying a network interface controller installed in the network node to collect the data packet which is transmitted from the network node in the network segment and directly analyzing the data packet.

7. The dual-modes switching method as claimed in claim 1, wherein in the illegal-network-node-type determining step, the static ARP information device is an information device whose internet protocol (IP) address and the MAC address are with one-to-one relationship.

8. The dual-modes switching method as claimed in claim 1, wherein in the second network connection blocking mode, the predetermined period is 4 seconds.

* * * * *